United States Patent [19]

Steinkaemper et al.

[11] Patent Number: 5,690,153
[45] Date of Patent: Nov. 25, 1997

[54] FILLING SYSTEM FOR ROBOT-CAPABLE FILLING OF A VEHICLE WITH FUEL

[75] Inventors: Reinhard Steinkaemper, Winnenden; Adolf Kremer, Remseck, both of Germany

[73] Assignee: Mercedes-Benz AG, Stuttgart, Germany

[21] Appl. No.: 706,558

[22] Filed: Sep. 5, 1996

[30] Foreign Application Priority Data

Sep. 5, 1995 [DE] Germany ............... 195 32 777.2

[51] Int. Cl.$^6$ ................................. B60K 15/00
[52] U.S. Cl. ............... 141/348; 141/312; 141/346; 141/384; 141/386
[58] Field of Search ............... 141/98, 312, 346, 141/348–350, 368, 382–386; 220/86.1, 86.2; 901/6

[56] References Cited

U.S. PATENT DOCUMENTS

| | | | |
|---|---|---|---|
| 3,168,125 | 2/1965 | Rosell | 141/346 |
| 3,473,569 | 10/1969 | Guertin et al. | 141/346 |
| 3,513,887 | 5/1970 | Limandri | 141/346 |
| 3,587,678 | 6/1971 | Hieber et al. | 141/346 |
| 3,976,100 | 8/1976 | Souslin | 141/346 |
| 4,567,924 | 2/1986 | Brown | 141/346 |
| 4,881,581 | 11/1989 | Hollerback | 141/98 |
| 5,238,034 | 8/1993 | Corfitsen | 141/348 |
| 5,301,723 | 4/1994 | Goode | 141/346 |
| 5,322,100 | 6/1994 | Buechler et al. | 141/312 |
| 5,435,358 | 7/1995 | Kempka et al. | 141/312 |
| 5,485,871 | 1/1996 | Romanek et al. | 141/312 |

FOREIGN PATENT DOCUMENTS

0 612 639  8/1994  European Pat. Off.

*Primary Examiner*—J. Casimer Jacyna
*Attorney, Agent, or Firm*—Evenson, McKeown, Edwards & Lenahan, P.L.L.C.

[57] ABSTRACT

A filling system for robot-capable filling of a motor vehicle with fuel includes a filler nozzle and a tank filler neck having a cylindrical docking extension provided with a central opening mounted on the filler side. In the upper section of the extension, rotatable around the axis of symmetry for the opening and closing of the tank closure, the filler nozzle is dockable by its outlet end to form a positive connection between the filler nozzle and the docking extension. In order to achieve in simple fashion a docking of the filler nozzle on the filler neck of the vehicle fuel tank for filling the tank that is always functionally reliable and free of impediments, it is provided that the positive elements of the two docking partners are lockable in one another in a locked position that acts axially and locks in a circumferential direction, with the positive elements of one of the docking partners being guided radially movably and flexibly tensioned in a working position opposite to the force of a pretensioning spring. The positive elements of the other docking partner are mounted rigidly, and the two docking partners are so designed that the radially displaceable positive elements are operable by a force directed axially to the docking extension.

16 Claims, 6 Drawing Sheets

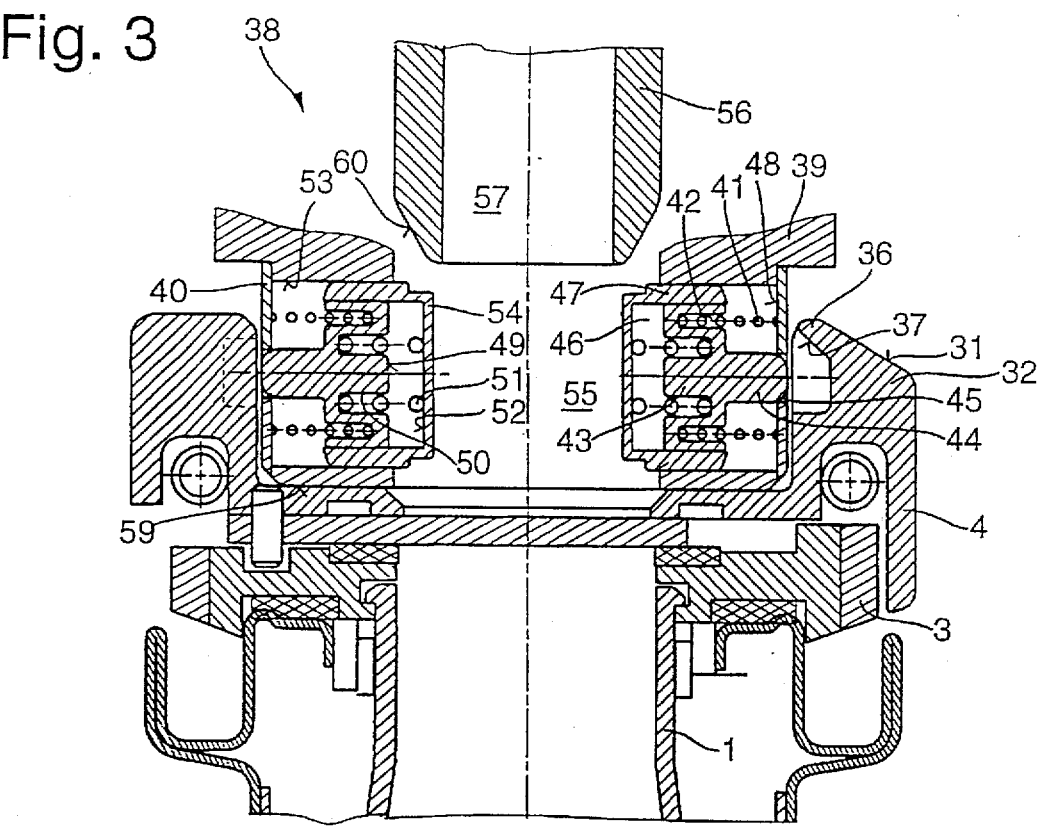
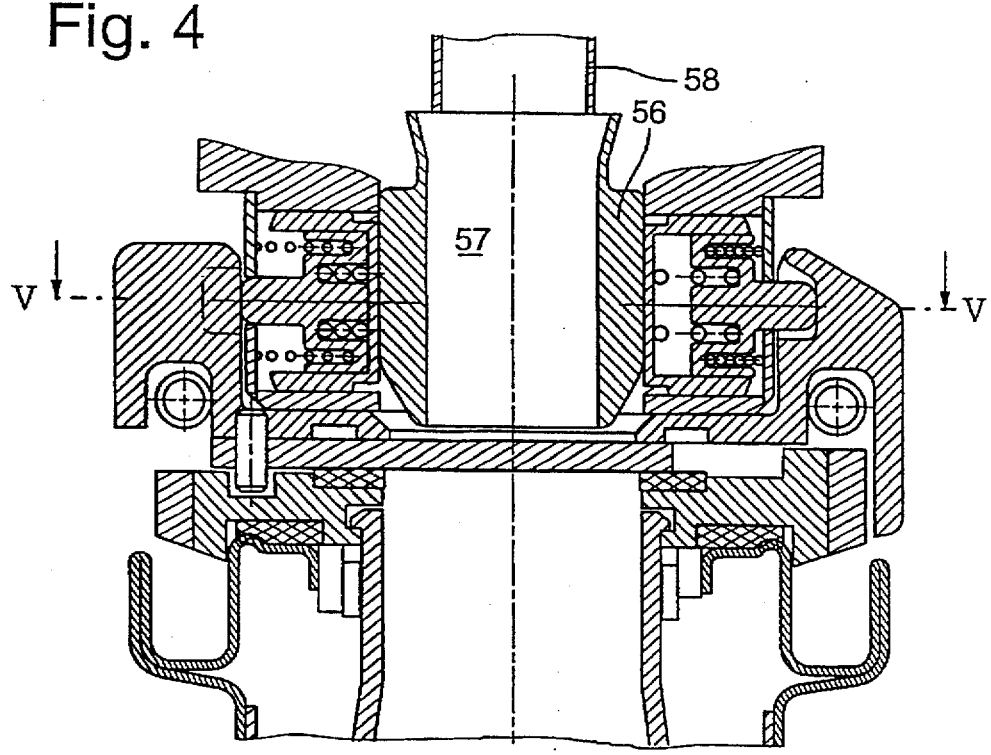

FILLING SYSTEM FOR ROBOT-CAPABLE FILLING OF A VEHICLE WITH FUEL

BACKGROUND AND SUMMARY OF THE INVENTION

The invention relates to a filling system and, more particularly, to a filling system for robot-capable filling of a vehicle with fuel, having a filler nozzle and a filler neck for the tank. A docking extension is provided on the filling side of the neck. The extension is cylindrical and has a central passageway in an upper rotatable section of the extension. The section is rotatable around the axis of symmetry for the opening and closing processes of the tank closure. The filler nozzle is dockable by its outlet end to form a positive connection between the filler nozzle and the docking extension. Positive elements are distributed along a circumference of the filler nozzle and docking extension and run axially in the manner of the teeth of a hub section and engage one another positively when the filler nozzle is ready to fill the tank.

A filling system of the above-mentioned type is known from European patent document EP 0 612 639 A1. This patent document includes a robot-guided filler nozzle and a docking extension mounted on a closure for the tank filler neck of a motor vehicle. The extension is made in the form of a hollow cylinder and has internal teeth into which external teeth formed circumferentially on the outlet end of the filling tube of the filler nozzle can engage positively when docking, so that the closure can be opened by rotating the docking extension via the filler nozzle to ensure slip-proof retention of the filler nozzle on the motor vehicle in the docked state. However, such docking is possible only if the teeth on the filler nozzle are guided precisely at the correct angle relative to the teeth of the docking extension. This is possible only with an expensive and very cumbersome sensing mechanism and a highly precise control associated therewith for the filler nozzle. If a sensing system and control of this type are not provided, the possibility is high that the teeth of the filler robot on the filler nozzle side will not enter the gaps between the teeth of the docking extension during the docking process, but instead will collide with the teeth of the extension. The robot, which cannot recognize the incorrect position without suitable additional sensing mechanisms, will continue pressing the filler nozzle against the filler neck, possibly damaging the filler neck and pushing the vehicle away. Although the probability of this case, in other words the collision of the tooth tips with one another, can be minimized by providing very fine pointed teeth on both parts, such teeth are sensitive to contamination and prone to malfunction as a result of wear. Likewise, if a vehicle occupant gets out of the vehicle during the filling process, rocking movements occur in the vehicle that result in separation of the two sets of teeth and interrupt the filling process abruptly and inadvertently, possibly causing fuel to flow freely out of the filler nozzle into the environment.

The goal of the invention is to provide an improved filling system such that docking of the filler nozzle with the filler neck of the vehicle fuel tank is functionally reliable and free of any impediments and is achieved in a simple fashion.

This goal is achieved according to the present invention by filling system for robot-capable filling of a vehicle with fuel, having a filler nozzle and a filler neck for the tank. A docking extension is provided on the filling side of the neck. The extension is cylindrical and has a central passageway in an upper rotatable section of the extension. The section is rotatable around the axis of symmetry for the opening and closing processes of the tank closure. The filler nozzle is dockable by its outlet end to form a positive connection between the filler nozzle and the docking extension. Positive elements are distributed along a circumference of the filler nozzle and docking extension and run axially in the manner of the teeth of a hub section and engage one another positively when the filler nozzle is ready to fill the tank. The positive elements of the two docking partners are lockable in one another in a locked position acting axially to lock in the circumferential direction. The positive elements of one of the docking partners are guided radially movably and tensioned flexibly in a working position against the force of a pretensioning spring. The positive elements of the other docking partner are made rigid. The two docking partners are so designed that the radially slidable positive elements are operable via a force directed axially to the docking extension.

As an advantage of the invention, the positive connection between the filler nozzle and filler neck required to swivel the cap that closes the filler neck is effected by radially flexible positive elements instead of teeth. The elements positively engage in the docked position with recesses on the filler nozzle and/or the docking extension that form matching positive elements, so that in the event of an initially incorrect positioning of the radially adjustable positive elements relative to the rigidly mounted positive elements, with no positive engagement occurring, the locked position and hence the secure coupled position are achieved by a slight rotation around the axis of the body. The slight twisting effort is especially favorable particularly with respect to a robot-guided filler nozzle having fuel hoses connected to it, in that twisting of the filler nozzle is largely prevented which would otherwise lead to considerable functional difficulties when filling as a result of possible kinking of the fuel hoses. Contamination on the docking extension or on the filler nozzle can no longer interfere with docking since the adjustable positive elements can deflect radially in a flexible manner and positive engagement is achieved between the adjustable and rigid positive elements in the radial direction. Thus, in a relatively simple fashion, a docking is made possible that is free of impediments and is independent of the relative angles of the filler nozzle and filler neck. The locking of the filler nozzle on the filler neck in the axial and circumferential directions in the locked position also prevents any undesired axial uncoupling of the filler nozzle and filler neck during rocking movements of the motor vehicle, thus achieving a functionally reliable coupling. Since the adjustable positive elements are urged by a pretensioning spring, no jamming occurs in the docked position, even in the event of a collision with a tooth tip on the rigidly mounted positive element.

It is also advantageous that the simple, functionally reliable, and impediment-free coupling occurs solely by the axial insertion movement of the filler nozzle into the filler neck and/or docking extension without any aids that engage externally.

Other objects, advantages and novel features of the present invention will become apparent from the following detailed description of the invention when considered in conjunction with the accompanying drawings.

BRIEF DESCRIPTION OF THE DRAWINGS

FIG. 3 shows in a sectional view the system according to the invention in the non-actuated state in a lateral lengthwise section with the filler nozzle in the docked position and with positive elements mounted on it that are compressible and adjustable, said positive elements being operable from the interior of the filler nozzle;

FIG. 4 shows the system in FIG. 3 in a lateral lengthwise section with the positive elements in the actuated state;

DETAILED DESCRIPTION OF THE DRAWINGS

Figure 1:
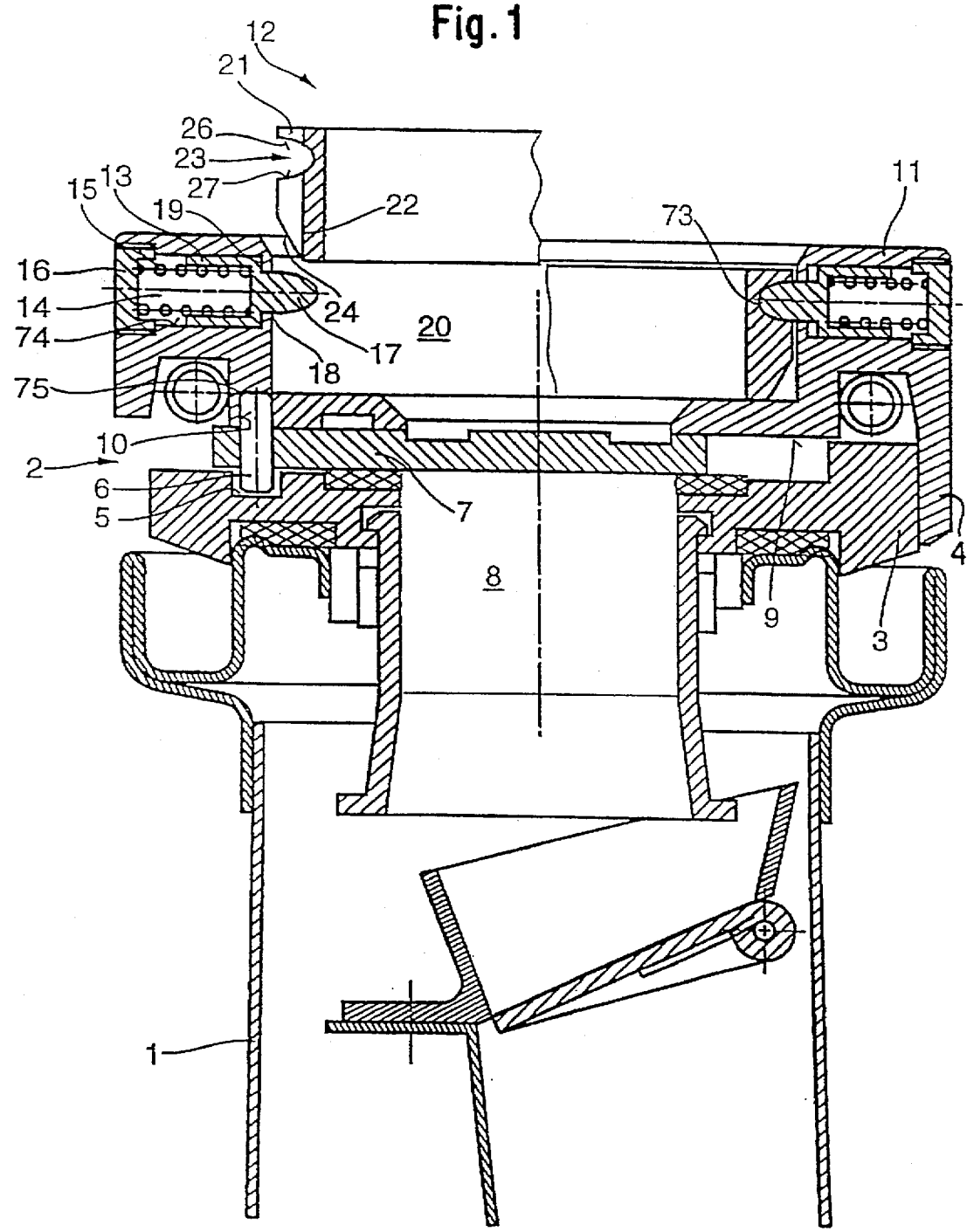
FIG. 1 shows a portion of the filling system according to the invention in a lateral lengthwise section, both before the insertion movement and in the docked position, with circumferential external teeth on the end of the filler nozzle on FIG. 2 is a top view of a cross section through the system in FIG. 1 during the insertion movement of the filler nozzle.

FIG. 1 shows a filler neck 1 of a fuel tank of a motor vehicle, sealed by a cap 2 screwed via a bayonet connection onto the neck 1. Cap 2 consists essentially of two annular bodies 3, 4, with cap 2 being screwed onto filler neck 1 by annular body 3. At the top of annular body 3 a vertical rotational axis (not visible in the drawing) is provided for a swiveling slide 7 that is pivotable horizontally and is permanently connected to said axis. The slide 7 closes a central inlet channel 8 of annular body 3 in a sealing manner. Annular body 4 is rotatably mounted on the top of annular body 3 to turn around the axis of the body itself, and has on its underside 9, near the edge, a recess 10 in which a drive pin 6 for pivoting slide 7 engages with its upper end 75 in a press fit. When annular body 4 rotates, drive pin 6 moves swiveling slide 7 circumferentially from an open to a closed position and vice versa, depending on the direction of rotation of annular body 4. The drive pin 6 is guided inside a guide path machined radially in swiveling slide 7. The pin 6 slides in annular body 3 at the top along a path 5 in the shape of an arc of a circle.

Annular body 4 has a coaxial hollow cylindrical docking extension 11 at the top, into which extension 11 a filler nozzle 12 can be inserted for filling. Radially aligned guide bores 74, machined from the exterior of the extension and designed as blind holes, are provided in the circumference of docking extension 11. In these bores 74, a hollow cylindrical piston 13 is guided. A pretensioning spring 15 abuts piston 13 in the piston cavity 14 endwise at one end. The spring abuts a screw closure 16 at the other end that seals guide bore 74.

A pin 17 having a round head on end 73 at the internal circumference is provided on piston 13 on the side away from the spring. The pin 17 projects through an opening 18 in end 19 of guide bore 74 into annular space 20 delimited by the inner circumference of docking extension 11. Piston 13, with pin 17 in the unactuated state, abuts end 19 of guide bore 74, urged by pretensioning spring 15. Pin 17 constitutes a radially adjustable positive element of docking extension 11 that acts as a docking partner for filler nozzle 12.

Figure 2:
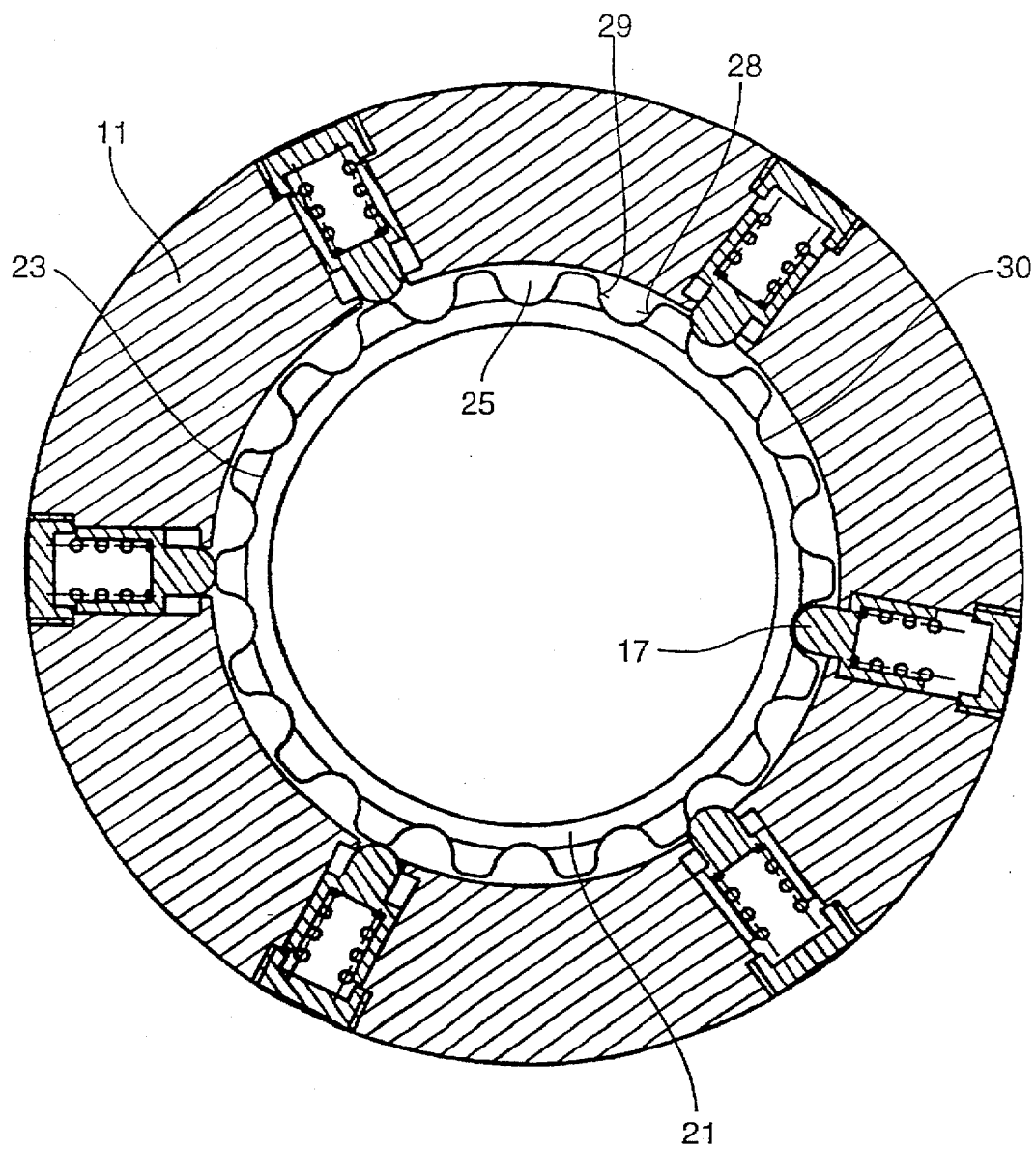

The matching positive element consists of circumferential outer teeth 21 formed circumferentially on outlet end 22 of filler nozzle 12. A notch-shaped circumferential annular groove 23 is machined into the teeth 21. The groove 23 penetrates the bottoms 30 of the gaps in the teeth (FIG. 2). Teeth 21 are bevelled 24 endwise.

During the docking motion, filler nozzle 12 with its teeth 21 enters the annular space 20 of docking extension 11 with some play, pressing the bevel 24 against the spring force of pretensioning spring 15 and pin 17 in the direction of guide bore 74. However, as a rule, one of the pins 17 enters one of the gaps 25 in the teeth during the insertion phase (FIG. 2). If the ends of the teeth 21 abut the upper side of the annular body 4, then the axial movement of the filler nozzle 12 is stopped. In this position, all pins 17 engage annular groove 23 and filler nozzle 12 is locked axially on docking extension 11 by the upper and lower flanks of annular groove 23 that act as stops. Filler nozzle 12 is locked in the circumferential direction by flanks 28, 29 of the gaps 25 in the teeth in which a pin 17 is engaged.

The nature of this locking is so favorable because it occurs automatically and simply in the course of the docking motion. In those cases in which no pin 17 has engaged a gap 25 in the teeth 21, the filler nozzle 12 is rotated in small increments until at least one of the pins 17 engages a gap 25. In this regard, it is important if the engagement is to occur after a slight rotation, that the number of gaps 25 in the teeth be a multiple of the number of pins, within the scope of technical feasibility. Locking in the circumferential direction means that the swiveling slide 7 can be opened or closed by a simple rotation of the filler nozzle 12.

Flanks 26, 27 of annular groove 23 are made in the form of segments of a circle, but they can also be beveled, so that an axial stop during rocking movements of the vehicle is provided for filler nozzle 12 on pin 17, but the nozzle can still slide out of docking extension 11 in an emergency undocking maneuver.

In order to nearly completely rule out any failure of all the pins 17 to lock, and mainly to avoid additional rotation to lock a pin 17 in a gap 25, and thus to prevent twisting of filler nozzle 12 and its connected fuel hoses, it is advisable to distribute the pins 17 irregularly on the circumference of docking extension 11 as shown in FIG. 2. Then after at least one rotation of the n-th portion of a tooth division, a pin 17 will enter a gap 25 if the arrangement of end pins 17 is such that the angular spacing between the (n−1) pin 17 in addition to the n-th portion of 360° also constitutes the n-th portion of the tooth division. The angular spacing with a successive arrangement of pins 17 in the circumferential direction, clockwise in this instance, from the sixth to the first pin 17, amounts to the difference between the n-th part of the sum of the teeth division and 360° and the teeth division. The number of pins 17 engaging the gaps 25 can be increased by associating at least one additional pin 17 with each of the pins 17 already provided. The additional pin is then located so that it is offset in the circumferential direction from the position of the mounted pin 17 by a multiple of the tooth division.

It is also possible in a structurally simplified design, instead of adding pin 17, to mount on the inner circumference of docking extension 11, flexible sheets having bumps that project radially into the annular space 20 and can be received in gaps 25 just like the pins 17. It is also possible for the pins 17 to be provided on the filler nozzle 12 and for the teeth 21 to be provided as internal teeth on the inner circumference of the docking extension 11, with the bevel 24 being formed at an upper end on the docking extension 11 and with the annular groove 23 being formed near the bottom in the circumference of the docking extension 11.

Figure 5:
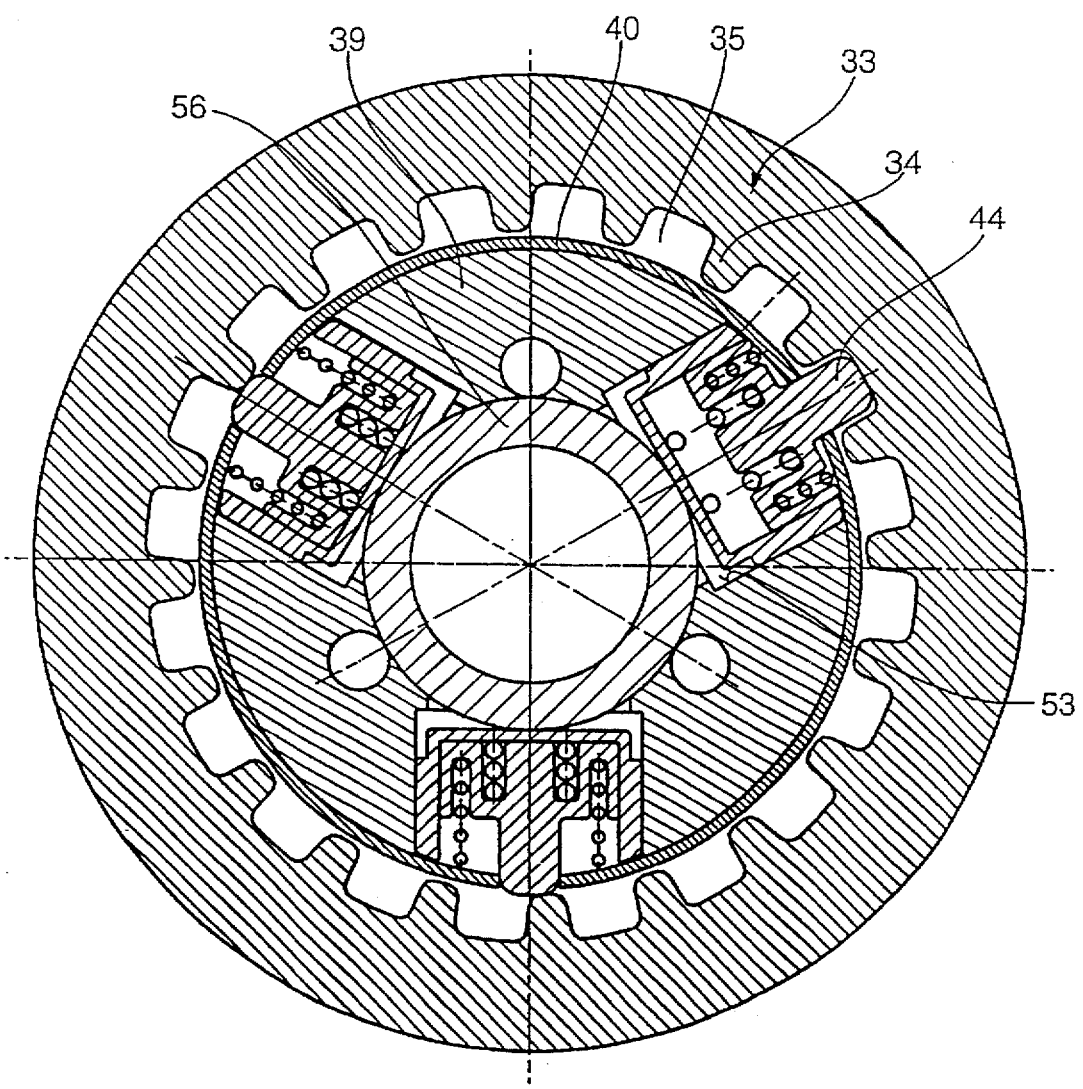
FIG. 5 shows the system in FIG. 4 in a section view taken along line V—V.

FIGS. 3–5 show a second embodiment of the invention. In this case, at end 31 of docking extension 32, a regular internal tooth structure 33, running coaxially with respect to the filler neck 1, are provided with a plurality of individual teeth 34 (20 in this case). Gaps 35 between the internal teeth 34 are covered axially at the top by noses 36 located at the upper ends of the gaps 35 and projecting inward, with side 37 of nose 36 facing the respective gap 35 being beveled upward so that although axially locking engagement in the tooth structure 33 is ensured, emergency undocking of filler nozzle 38 is still possible. The nozzle can slide out of the docking extension 32 after overcoming a certain retaining force.

A cylindrical sleeve 40 is inserted into and fastened to the end 39 of the filler nozzle 38 inserted into the docking extension 32, said end hereinafter being referred to as the "end effector," to which sleeve a radially acting pretensioning spring 41 is fastened internally. The spring 41 in turn is secured at its other end in an annular recess 42 of a slide 43. Slide 43 is provided centrally with a pin 44 that projects radially outward and has a rounded head. The pin 44 in the unlocked position of filler nozzle 38 on docking extension 32, ends flush with an opening 45 provided in the sleeve 40. The opening 45 is dimensioned so that pin 44 fits in it with some play and is guidable therein.

Slide 43 is guided in a radially-directed cavity 46 of a hollow piston 47, with an opening to an interior 48 of the sleeve. The slide 43 has, on its side 49 facing away from interior 48 of sleeve 40, an additional annular recess 50, in which a spreader spring 51 is secured at one end. At the other end, the spreader spring 51 abuts the interior 52 of the hollow piston 47 that faces away from the slide 43. Hollow piston spreader spring 51, and slide 43 constitute an adjustable positive element. Hollow piston 47 in turn is guided in a radially-directed guide bore 53 of end effector 39. The hollow piston 47, with its wall section 54 parallel to side 49 of slide 43 facing away from the sleeve, is urged by spreader spring 51 and projects into central passageway 55 of the end effector.

Filler nozzle 38 has a cylindrical pressure slide 56 guided mechanically or by fluid inside passageway 55. The slide is beveled at its end and has a central passageway 57 for a filling tube 58 of filler nozzle 38 (FIG. 4). Docking is performed initially by the insertion of end effector 39 into docking extension 32 until end 59 of end effector 39 comes to rest on the top of annular body 4 and the axial movement of filler nozzle 38 relative to filler neck 1 stops.

Then pressure slide 56 is lowered, said slide impacting the hollow piston 47 at its wall section 54 with its bevel 60 so as to urge it radially into guide bore 53 up to sleeve 40. Spreader spring 51 has a higher force than pretensioning spring 41, so that as a result of the actuation of piston 47 by pressure slide 46, pretensioning spring 41 is compressed and pin 44 mounted on slide 43 is forced through opening 45 of sleeve 40. The adjustable positive element is thus forcibly actuated by pressure slide 56.

When pin 44 strikes a tooth tip 61 of internal teeth 33, pin 44 is pressed inward against the force of spreader spring 51 into hollow piston 47 so that no jamming occurs during docking (FIG. 4 and FIG. 5). The adjustable positive element is thus compressible in a telescoping manner. If pin 44 is opposite a gap 35, it can engage it. Pressure slide 56 remains in this position during docking so that filler nozzle 38 is forcibly locked to docking extension 32. Locking is accomplished by the engagement of a pin 44 in a gap 35 in the circumferential direction and through nose 36 via gap 35 in the axial direction as well. Nose 36 can also be made in a circumferential shape.

If none of the three pins 44 arranged symmetrically in the circumferential direction enters a gap 35, then the end effector 39 of filler nozzle 38, or the filler nozzle 38 as a whole, is rotated, whereby due to the low pitch modulus of the internal teeth 33, only a small amount of rotation is required until the pin 44 engages a gap and is forced radially outward by spreader spring 51 and pretensioning spring 41.

In the locked position, swiveling slide 7 can then be opened by rotation of filler nozzle 38 to fill the tank. After assuming the locked position, filling tube 58 of filler nozzle 38 is guided through opening 57 of pressure slide 56 and into filler neck 1 for filling. It is also possible to use the filler tube 58 itself instead of pressure slide 56 as the actuating element for the adjustable positive element, with filler tube 58 being beveled endwise to match pressure slide 56.

After filling, pressure slide 56 is raised, springs 41 and 51 expand, and pin 44 enters end effector 39, thus eliminating circumferential and axial locking.

Figure 6:
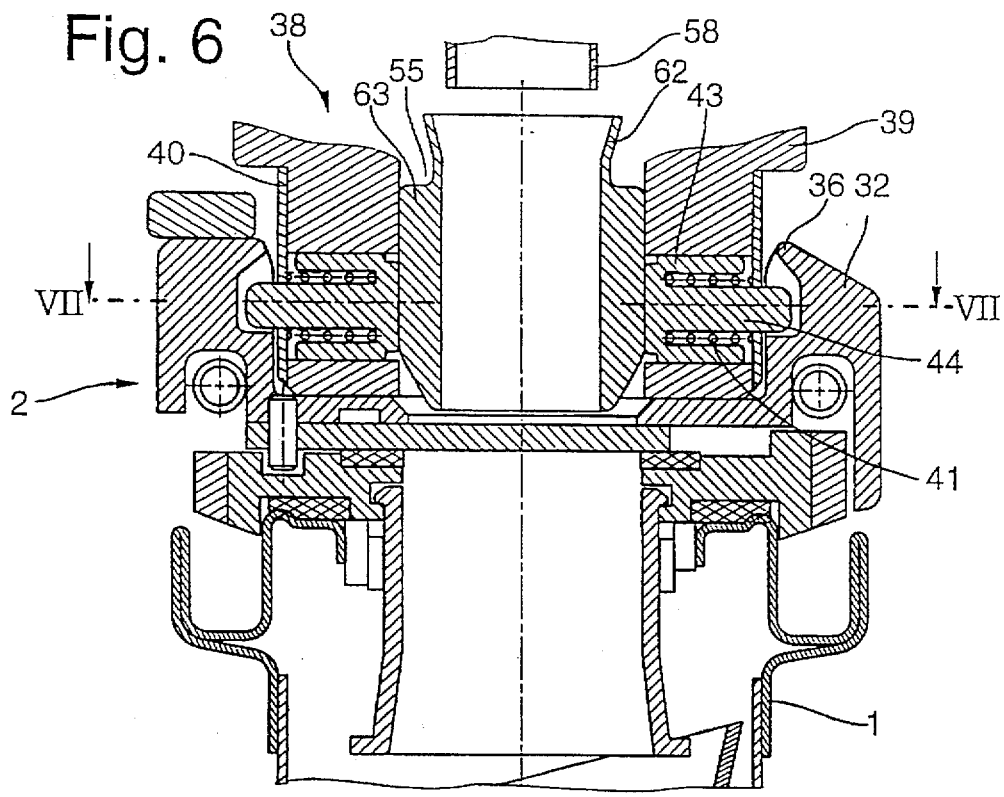
FIG. 6 shows, in a lateral lengthwise section, portions of the system according to the invention with the filler nozzle in the docked position and with incompressible and adjustable positive elements mounted on said nozzle, said elements being operable from the interior of the filler nozzle, in the actuated state and with internal teeth having broad gaps and designed as matching positive elements in the docked position.
Figure 7:
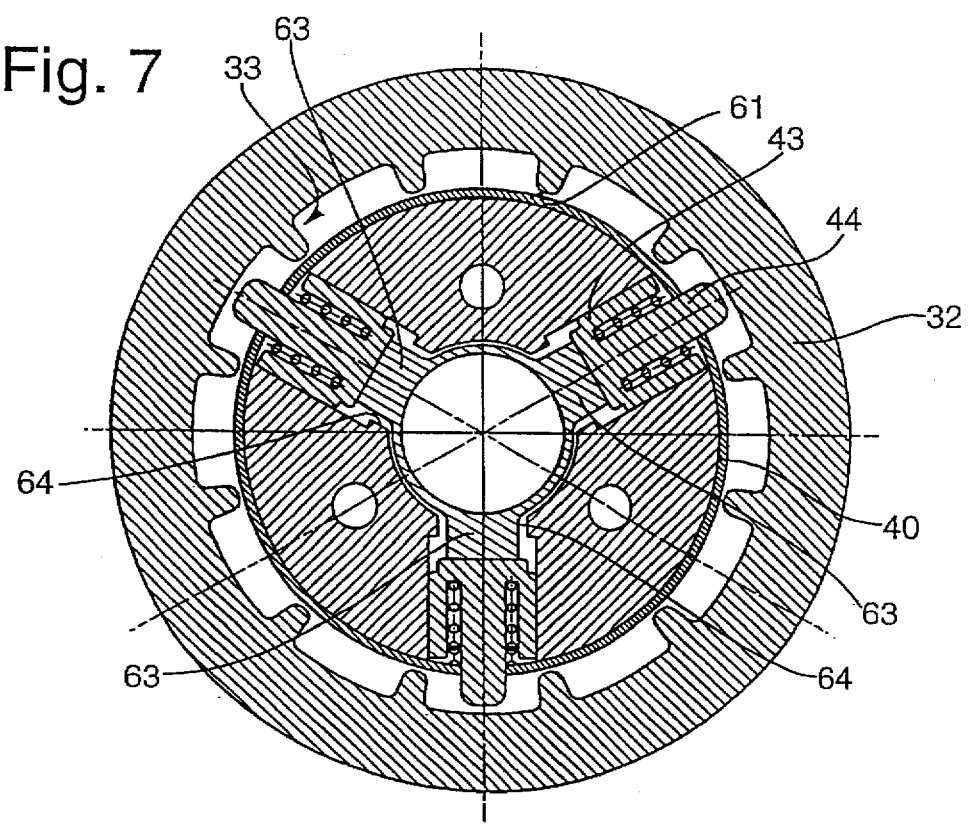
FIG. 7 shows the system in FIG. 6 in a section view taken along line VII—VII.

Another structurally simplified embodiment of the invention, by comparison with those in FIGS. 3 to 5, is shown in FIGS. 6 and 7, with only the docked position being shown. In contrast to the embodiment described above, the spreader spring 51 and the hollow piston 47 are eliminated.

The adjustable positive element is formed only by slide 43 and pin 44 which are urged by pretensioning spring 41 out of sleeve 40 until the slide 43 enters the central opening area 55. In the docked position, the slide 43 is actuated directly by a pressure slide 62 which has the shape of a hollow cylinder but has three teeth 63 projecting radially outward on its jacket surface. The teeth 63 are arranged to correspond to the symmetrical arrangement of the adjustable positive elements in the circumferential direction. For this purpose, pressure slide 62 is guided not only in central opening 55 but also by its teeth 63 in axially extended guide grooves 64 that intersect guide bores 53 (as in FIG. 5) at the back.

Teeth 63 are beveled at their ends, so that when the pressure slide 62 is lowered against the spring force of spring 41, the slide 43 is pressed radially outward. In order to avoid jamming of filler nozzle 38 on docking extension 32 that could result when pins 44 hit tooth tips, internal teeth 33 are designed with a gap width that is a multiple of the pin width, so that the probability of a pin 44 colliding with a tooth tip is minimized.

In addition, the docked position 36 is determined on the basis of a defined screwing position of cap 2 on filler neck 1. The position is programmed into the filling robot. As a result, with only slight tolerance in the angular deviation of the relative circumferential position of filler nozzle 38 from that of docking extension 32, the robot moves toward the latter and inserts filler nozzle 38 into it. The tolerances are thus compensated by the increased gap width of internal teeth 33.

Figure 8:
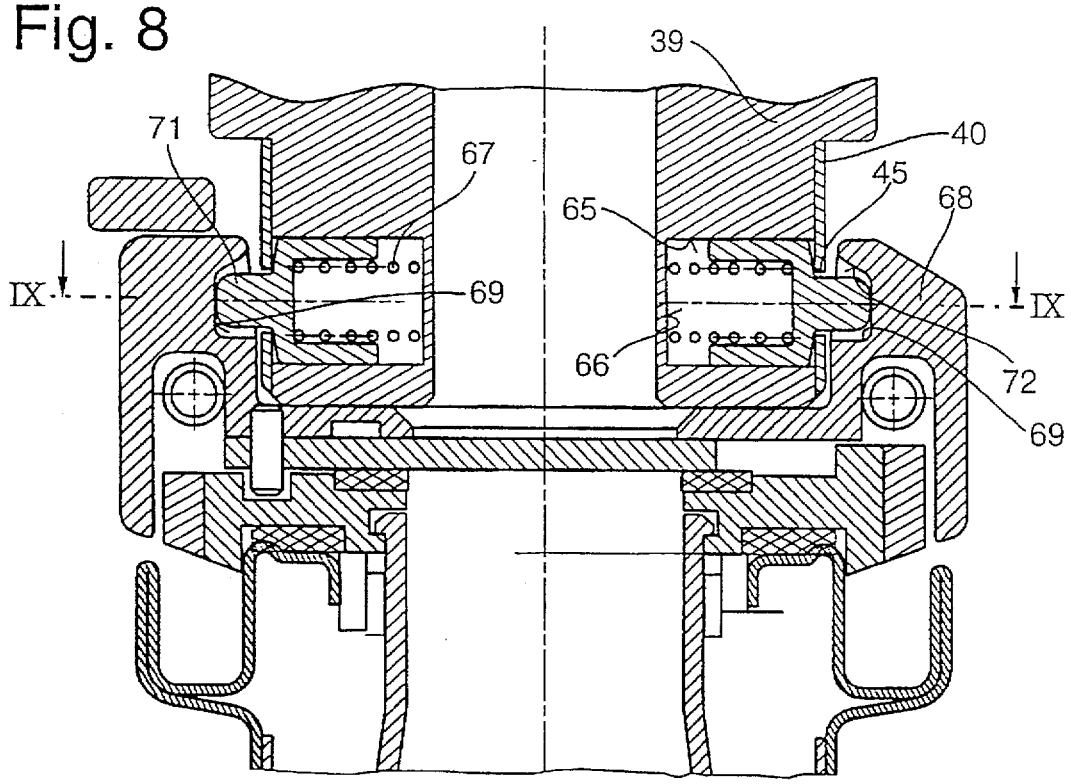
FIG. 8 shows, in a lateral lengthwise section, portions of the system according to the invention with the filler nozzle in the docked position and with the adjustable positive elements mounted on said nozzle engaging a guide groove provided on the docking extension by a bayonet lock, in the locked position.
Figure 9:
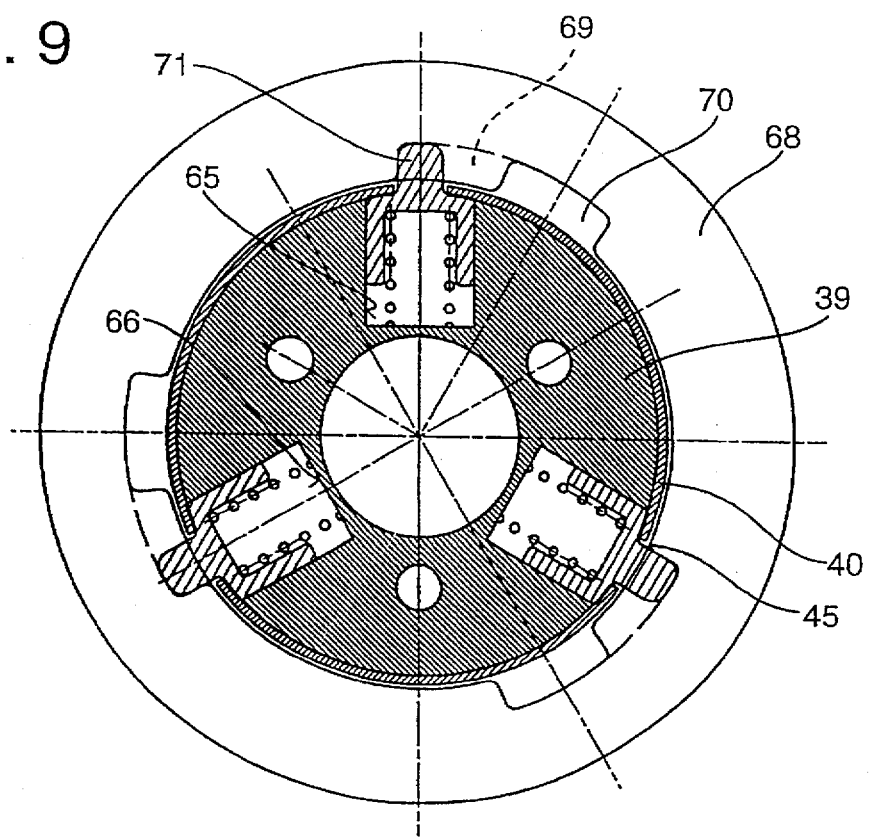
FIG. 9 shows the system in FIG. 8 in a section view taken along line IX—IX.

Another embodiment is shown in FIGS. 8 and 9, with the filling system shown in the docked position. In contrast to FIGS. 3 to 5, end effector 39 has three guide bores 65. The bores 65 are being distributed symmetrically around the circumference, machined from the circumference, and designed as blind holes, into each of which bores 65 an adjustable positive element of the design shown in FIGS. 1 and 2 is guided and forced through an opening 45 in sleeve 40 by a pretensioning spring 67 abutting the bottom 66 of the bore.

Docking extension 68, on the other hand, instead of internal teeth 33 like a bayonet lock, has guide grooves 69 running in the circumferential direction, whose openings 70 are arranged endwise thereon. Here again successful docking requires that the position of docking extension 68 be predetermined in a circumferential direction and that it be programmed into the filling robot so that pins 71 can enter unimpeded into openings 70 which are made wide by analogy with the purpose of the width of the gaps in internal teeth 33 in FIGS. 7 and 8. After a short rotation of filler nozzle 38, pins 71 lock into the stop position that acts in the circumferential direction.

Upper flank 72 of guide grooves 69 extends upward with a bevel. During rapid undocking, this means that pins 71 can slide out of guide grooves 69. The pins 71 are thus forced back into their guide bores 65. Springs 67 are required for both emergency and rapid undocking in this version. This version shows a structurally simple filling system in which locking automatically takes place in the axial and circumferential directions upon rotation of filler nozzle 38.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A filling system for an automated filling of a vehicle with fuel, comprising:

a filler nozzle;

a filler neck for a tank of the vehicle;

a docking extension provided on a filling side of said filler neck, said docking extension having a cylindrical shape and a central passageway in an upper rotatable section thereof, said upper rotatable section being rotated around an axis of symmetry for opening and closing the tank;

wherein said filler nozzle has an outlet end which docks with said docking extension to form a positive connection between said filler nozzle and said docking extension;

positive locking elements distributed along a circumference of said filler nozzle and docking extension and running axially in a toothed manner so as to engage one another when said filler nozzle is ready to fill said tank;

wherein said filler nozzle and said docking extension are docking partners having said positive elements lockable in one another in a locked position, said positive elements acting axially to lock in a circumferential direction;

wherein positive elements of one of said docking partners are movably guided radially and tensioned flexibly in a working position against a force of a pretensioning spring; and wherein positive elements of the other of said docking partners are rigidly mounted, said docking partners actuating said radially movable positive elements via a force directed in an axial direction with respect to said docking extension.

2. The system according to claim 1, wherein said radially movable positive elements are automatically operated via beveled surfaces of said rigidly mounted positive elements of the other docking partner as a result of a docking and undocking movement of said filler nozzle.

3. The system according to claim 1, wherein said radially movable positive elements are guided on an outlet side on said filler nozzle and are forcibly displaced radially outward from an internal position Via actuating elements located inside said filler nozzle and axially movable therein.

4. The system according to claim 3, wherein said actuating elements are one of a mechanically and fluidically adjustable pressure slides having beveled ends and a central opening for a filler tube of said filler nozzle.

5. The system according to claim 3, wherein said actuating elements are a filler tube arranged in a displaceably movable manner in said filler nozzle, said filler tube having a beveled surface on an outlet side.

6. The system according to claim 3 wherein said radially movable positive elements are guided out of both a hollow piston and a slide guided in a cavity of said hollow piston in a radial direction, and is provided with a pin projecting radially outward;

wherein said radially movable positive elements include a spreader spring supported between said hollow piston internally and at its end on said slide on a side facing away from said pin, said spreader spring urging said hollow piston into a central opening of said filler nozzle to a point where it is operated by one of said actuating elements such that said radially movable positive elements, in cooperation with said spreader spring, are compressible in a telescoping manner with a pretensioning spring, said pretensioning spring being coaxial relative to said spreader spring and arranged closer to said sleeve.

7. The system according to claim 3, wherein a gap width of teeth provided on said docking extension and forming said rigidly mounted positive elements is a multiple of a width of a part of said radially movable positive elements which act to perform the locking.

8. The system according to claim 1, wherein said radially movable positive elements of said one docking partner are designed as pins having rounded heads on their ends.

9. The system according to claim 1, wherein the number of rigidly mounted positive elements is a multiple of the number of radially movable positive elements.

10. The system according to claim 1, wherein said rigidly mounted positive elements are commonly formed by gaps arranged in circumferential teeth.

11. The system according to claim 10, wherein said radially movable positive elements are distributed circumferentially in an irregular manner, with an angular spacing between (n−1) of said elements regularly being an n-th part of a teeth division in addition to an n-th part of 360°, and with an angular spacing in a successive arrangement of said adjustable positive elements in a circumferential direction amounting to a difference between the n-th part of the sum of the teeth division and 360°, and the teeth division, in a circumferential direction.

12. The system according to claim 11, further comprising at least one additional radially movable positive element associated with each of said radially movable positive elements, said additional radially movable positive element being offset from said radially movable positive elements in a circumferential direction by a multiple of a tooth division.

13. The system according to claim 10, wherein a circumferential notch-shaped annular groove is machined into said rigidly mounted elements in the form of teeth, into which notch-shaped annular groove said radially movable positive elements of said filler nozzle engage in an axially locking manner with groove flanks, upper and lower sides of said radially movable positive elements forming stops against one another.

14. The system according to claim 13, wherein at least one of said groove flanks of said groove is beveled, said one flank forming part of an upwardly acting axial stop for said filler nozzle.

15. The system according to claim 1, wherein a radially projecting beveled nose is provided at an end on said rigidly mounted positive elements, said beveled nose forming an upwardly acting axial stop with a respectively engaged radially movable positive element for said filler nozzle.

16. The system according to claim 1, wherein said rigidly mounted positive elements are in the form of guide grooves having a bayonet lock, openings of said guide grooves being located at an end on one of said docking partners.

* * * * *